(12) United States Patent
Gupta et al.

(10) Patent No.: US 11,144,475 B2
(45) Date of Patent: Oct. 12, 2021

(54) MANAGING INDICATION OF ACCESSED TRACKS IN CACHE TO A MOST RECENTLY USED END OF A CACHE LIST

(71) Applicant: INTERNATIONAL BUSINESS MACHINES CORPORATION, Armonk, NY (US)

(72) Inventors: Lokesh M. Gupta, Tucson, AZ (US); Kyler A. Anderson, Sahuarita, AZ (US); Kevin J. Ash, Tucson, AZ (US); Matthew J. Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 16/543,377

(22) Filed: Aug. 16, 2019

(65) Prior Publication Data

US 2021/0049108 A1     Feb. 18, 2021

(51) Int. Cl.
  *G06F 12/123*     (2016.01)
(52) U.S. Cl.
  CPC ...... *G06F 12/123* (2013.01); *G06F 2212/608* (2013.01)
(58) Field of Classification Search
  CPC .................. G06F 2212/608; G06F 12/123
  USPC .................................................. 711/134, 136
  See application file for complete search history.

(56) References Cited

U.S. PATENT DOCUMENTS

| | | | |
|---|---|---|---|
| 9,710,398 B2 | 7/2017 | Ash et al. | |
| 9,733,991 B2 | 8/2017 | Ash et al. | |
| 10,114,753 B2 | 10/2018 | Ash et al. | |
| 2013/0024625 A1 | 1/2013 | Benhase et al. | |
| 2013/0046920 A1 | 2/2013 | Ryu et al. | |
| 2014/0129779 A1* | 5/2014 | Frachtenberg | G06F 12/122 711/136 |
| 2015/0026409 A1* | 1/2015 | Ash | G06F 12/0804 711/133 |
| 2017/0344493 A1 | 11/2017 | Ash et al. | |
| 2018/0300257 A1 | 10/2018 | Ash et al. | |

OTHER PUBLICATIONS

Insertion and Promotion for Tree-Based PseudoLRU Last-Level Caches by Jimenez (Year: 2007).*

(Continued)

*Primary Examiner* — Paul M Knight
(74) *Attorney, Agent, or Firm* — Konrad Raynes Davda & Victor LLP; David W. Victor (57) ABSTRACT

A computer program product, system, and method for managing adding of accessed tracks in cache to a most recently used end of a cache list. A cache list for the cache has a least recently used (LRU) end and a most recently used (MRU) end. Tracks in the cache are indicated in the cache list. A track in the cache indicated on the cache list is accessed. A determination is made as to whether a track cache residency time since the accessed track was last accessed while in the cache list is within a region of lowest track cache residency times. A flag is set for the accessed track indicating to indicate the track at the MRU end in response to determining that the track cache residency time of the accessed track is within the region of lowest track cache residency times. The accessed track remains at a current position in the cache list before being accessed after setting the flag.

21 Claims, 6 Drawing Sheets

(56) References Cited

OTHER PUBLICATIONS

Cache Replacement Based on Reuse-Distance Prediction by Keramidas (Year: 2007).*
A Survey of Techniques for Cache Partitioning in Multicore Processors by Mittal (Year: 2017).*
Reducing Cache Pollution Through Detection and Elimination of Non-Temporal Memory Accesses by Sandberg (Year: 2010).*
Notice of Allowance for U.S. Appl. No. 16/543,396, dated Sep. 23, 2020, 12 pp.
Ding, X., et al., "BP-Wrapper: A System Framework Making Any Replacement Algorithms (Almost) Lock Contention Free", IEEE 25th International Conference on Data Engineering, 2009, 12 pp.
Patent Application for U.S. Appl. No. 16/543,396, filed Aug. 16, 2019, 33 pp.
List of IBM Patents or Patent Applications Treated as Related, Aug. 16, 2019, 2 pp.

* cited by examiner

MANAGING INDICATION OF ACCESSED TRACKS IN CACHE TO A MOST RECENTLY USED END OF A CACHE LIST

BACKGROUND OF THE INVENTION

1. Field of the Invention

The present invention relates to a computer program product, system, and method for managing adding of accessed tracks in cache to a most recently used end of a cache list.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU cache list for the accessed track is moved to a Most Recently Used (MRU) end of the list. If the requested track is not in the cache, i.e., a cache miss, then the track in the cache whose entry is at the LRU end of the list may be removed and demoted and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

In order to move a track to the MRU end when it is accessed, the process managing the cache needs to obtain a lock on the LRU cache list. Since this lock is highly sought by many processes, there may be substantial lock contention to obtain the lock.

One technique to address lock contention is to batch the tracks that need to be moved to the MRU end in an MRU array. When the MRU array is full, all the tracks in the MRU array are moved to the MRU end of the cache list. Another technique to address lock contention is cache partitioning where multiple LRU lists are maintained for different partitions of track where each partition has its own LRU lock.

There is a need in the art for improved techniques for moving tracks toward the MRU end of the cache when accessed.

SUMMARY

A computer program product, system, and method for managing adding of accessed tracks in cache to a most recently used end of a cache list. A cache list for the cache has a least recently used (LRU) end and a most recently used (MRU) end. Tracks in the cache are indicated in the cache list. A track in the cache indicated on the cache list is accessed. A determination is made as to whether a track cache residency time since the accessed track was last accessed while in the cache list is within a region of lowest track cache residency times. A flag is set for the accessed track indicating to indicate the track at the MRU end in response to determining that the track cache residency time of the accessed track is within the region of lowest track cache residency times. The accessed track remains at a current position in the cache list before being accessed after setting the flag.

DETAILED DESCRIPTION

In current art, tracks that are accessed may be batched and then the batch of tracks are repositioned at the MRU end of the cache list. Operations to move indication of a track on and off a cache list causes latency in processing read/write requests to obtain the needed locks to move tracks on and off the cache list. Described embodiments provide improvements to computer caching technology by providing enhanced decision making to determine whether a track considered for demotion, such as at a least recently used (LRU) end in the cache list, should be added back to the MRU end. In the described embodiments, before moving a track accessed while in cache back to the MRU end, a consideration is made whether the track cache residency time of the accessed track is within a region of lowest track cache residency times of tracks indicated in the cache list. If the accessed track is within the region of lowest track cache residency times, then a flag is set for the accessed track indicating to indicate the accessed track at the MRU end in response to determining that the track cache residency time of the accessed track is within the region of lowest track cache residency times. The accessed track remains at a current position in the cache list before being accessed after setting the flag.

With the described embodiments, cache latency is reduced because an accessed track that is likely to have a high cache hit ratio is not moved to an MRU array or immediately re-MRU'd, which requires resources to accomplish. Instead, accessed tracks having a likelihood of a high cache hit ratio remain indicated in their same position in the cache list, with the flag being set to make sure they are moved back toward the MRU end when reaching the LRU end of the cache list.

Figure 1:
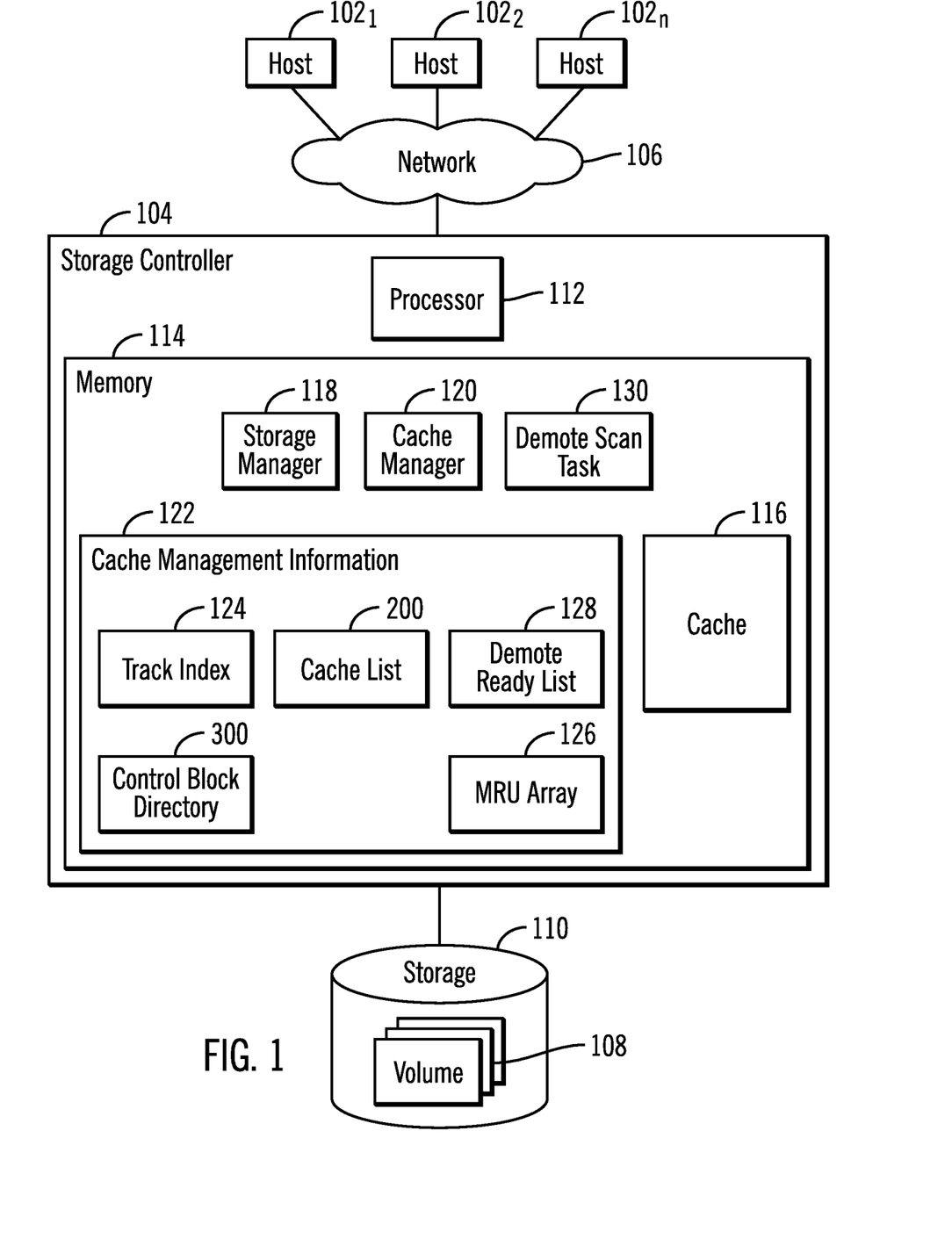
FIG. 1 illustrates an embodiment of a computing environment.

FIG. 1 illustrates an embodiment of a computing environment. A plurality of hosts $102_1, 102_2 \ldots 102_n$ may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes one or more processors 112 and a memory 114, including a cache 116 to cache data for the storage 110. The processor 112 may comprise a separate central processing unit (CPU), one or a group of multiple cores on a single CPU, or a group of processing resources on one or more CPUs. The cache 116 buffers data transferred between the hosts $102_1, 102_2 \ldots 102_n$ and volumes 108 in the storage 110.

The memory 114 further includes a storage manager 118 for managing the transfer of tracks transferred between the hosts $102_1, 102_2 \ldots 102_n$ and the storage 110 and a cache manager 120 that manages data transferred between the hosts $102_1, 102_2 \ldots 102_n$ and the storage 110 in the cache 116. A track may comprise any unit of data configured in the storage 110, such as a track, Logical Block Address (LBA), storage cell, group of cells (e.g., column, row or array of cells), sector, segment, etc., which may be part of a larger grouping of tracks, such as a volume, logical device, etc.

The cache manager 120 maintains cache management information 122 in the memory 114 to manage read (unmodified) and write (modified) tracks in the cache 116. The cache management information 122 may include a least recently used (LRU) cache list 200 in which to indicate tracks in the cache 116; a track index 124 providing an index of tracks in the cache 116 to cache control blocks in a control block directory 300, where there is one cache control block for each track in the cache 116 providing metadata on the track in the cache 116 and the cache list 200 may indicate cache control blocks $300_i$ in the directory 300; a most recently used (MRU) array 126, also referred to as an MRU list, having tracks added to the cache 116 that have not yet been indicated in the cache list 200 to allow batches of tracks to be added to the cache list 200 at once to improve cache processing efficiency because a single lock request may be used to add multiple newly added tracks to the cache 116 in the cache list 200; and a demote ready list 128 indicating tracks removed from an LRU end 204 of the cache list 200 that are ready to demote from the cache 116.

The processor 112 executes a demote scan task 130 to scan the cache list 200 to determine unmodified tracks to add to the demote ready list 128.

The storage manager 118, cache manager 120, and demote scan task 130 are shown in FIG. 1 as program code loaded into the memory 114 and executed by one or more of the processors 112. Alternatively, some or all of the functions may be implemented as microcode or firmware in hardware devices in the storage controller 104, such as in Application Specific Integrated Circuits (ASICs).

The storage 110 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts $102_1, 102_2 \ldots 102_n$ may connect to the storage controller 104 over a bus interface, such as a Peripheral Component Interconnect (PCI) bus interface and other interfaces known in the art.

Figure 2:
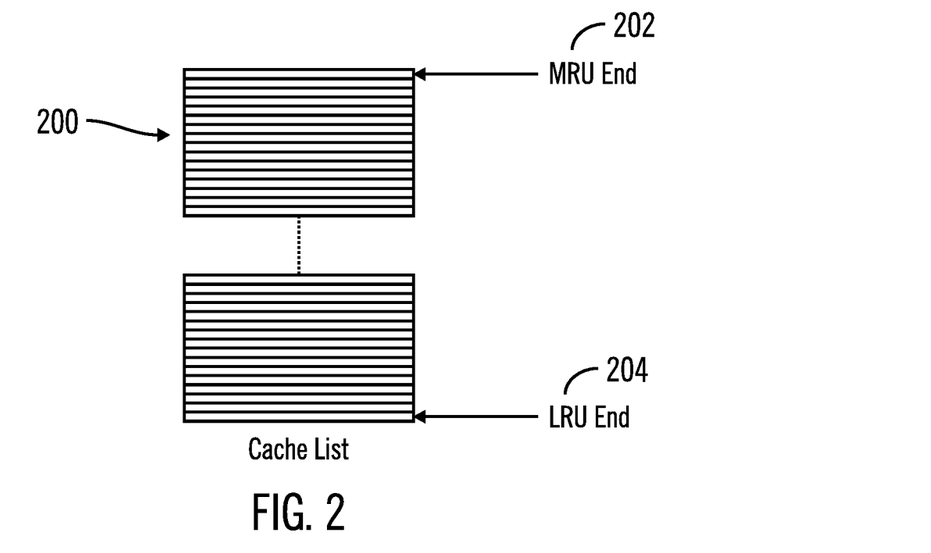
FIG. 2 illustrates an embodiment of a Least Recently Used (LRU) list.

FIG. 2 illustrates an embodiment of the cache list 200 as a Least Recently Used (LRU) list 200, having a most recently used (MRU) end 202 identifying a track most recently added to the cache 116 or most recently accessed in the cache 116 and a least recently used (LRU) end 204 from which the track identified at the LRU end 204 is selected to demote from the cache 116. As a track is added to the MRU end 202, other tracks move downward toward the LRU end 204. If there is not sufficient space for the track being added to the MRU end 202, then a track may be demoted from the LRU end 204 to make room for the new track being added to the cache list 200.

Figure 3:
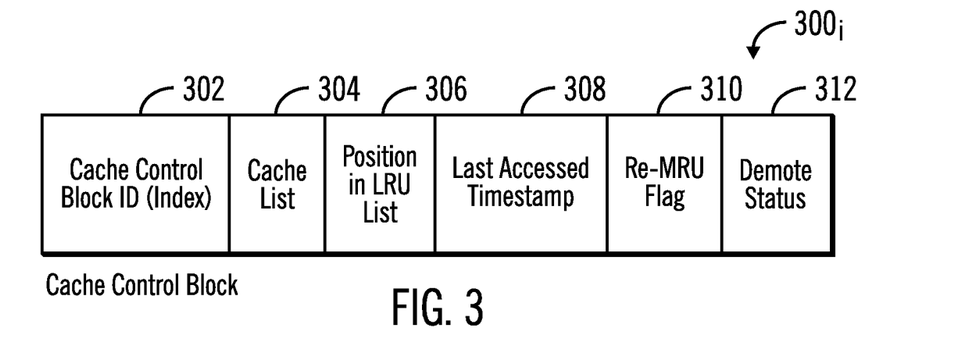
FIG. 3 illustrates an embodiment of a cache control block.

FIG. 3 illustrates an embodiment of an instance of a cache control block $300_i$ for one of the tracks in the cache 116, including, but not limited to, a cache control block identifier 302, such as an index value of the cache control block $300_i$; the cache list 304 in which the track associated cache control block $300_i$ is indicated; a position in the LRU cache list 306 where the track is indicated; a last accessed timestamp 308 indicating a time the track was last accessed in the cache 116, such as read; a re-MRU flag 310 indicating whether the track needs to be indicated at the MRU end 202 of the cache list 200, such as if the track is accessed while indicated in the cache list 200; and a demote status 312 indicating whether the track identified by the cache control block $300_i$ is to be demoted from the cache 116 and indicated in the demote ready list 128. Additional information may be included in the cache control block $300_i$ not mentioned herein that is used to manage the track in the cache 116.

In certain embodiments, the timestamp 308 may be set to a sequence number that is periodically incremented, such as at every clock cycle or couple of milliseconds.

Figure 4:
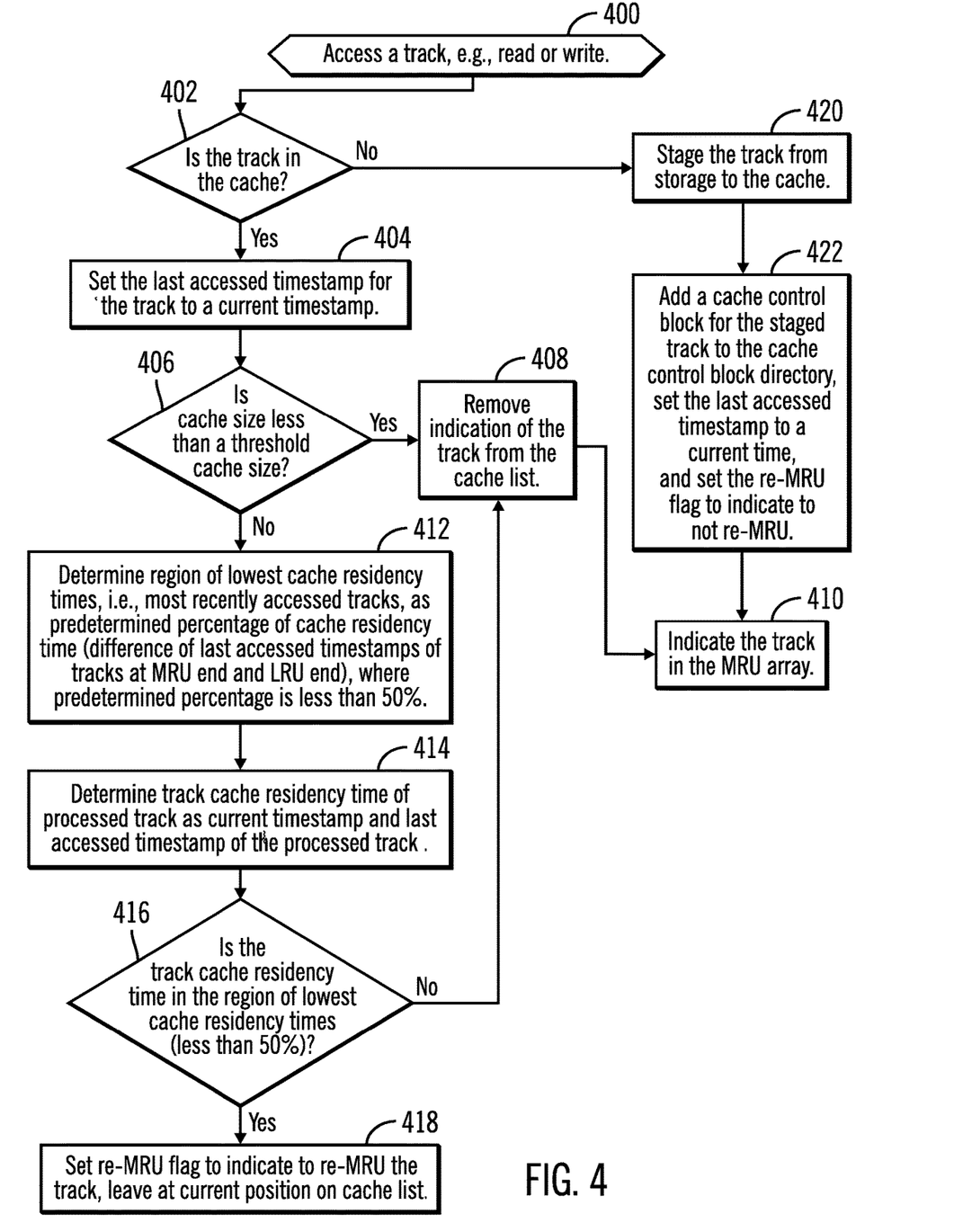
FIG. 4 illustrates an embodiment of operations to process an access request to a track.

FIG. 4 illustrates an embodiment of operations performed by the cache manager 120 to process an access request, such as a read or write, to a track. Upon receiving (at block 400) an access request, if (at block 402) the track is in the cache 116, then the last accessed timestamp 308 in the cache control block $300_i$ for the accessed track is set (at block 404) to a current system timestamp. If (at block 406) the cache 116 size is less than a threshold case size, then indication of the accessed track in the cache list 200 is removed (at block 408) from the cache list 200 and the accessed track is indicated (at block 410) in the MRU array 126 to batch add to the MRU end 202 when a condition is satisfied, such as the MRU array 126 is full. If (at block 406) the cache 116 size is greater than (or greater than or equal to) the threshold cache size, then a determination is made (at block 412) of a region of lowest cache residency times of tracks in the cache list 200, tracks having been in cache the least amount of time since the tracks were last accessed, which also comprises a region of most recently accessed tracks in the cache 200. A determination is also made (at block 414) of the track cache residency time of the processed track as a current timestamp and last accessed timestamp 308 of the processed track.

The region of lowest track cache residency times may comprise a percentage of an entire cache residency time. A track having a track cache residency time within or less than the percentage of the entire cache residency time would be in the region of lowest track cache residency times. A track having a track cache residency time greater than the percentage of the entire cache residency time would be outside of the region of lowest cache residency times. The region of lowest track cache residency times may also comprise a region of tracks having been most recently accessed while in the cache list 200.

A track cache residency time may comprise a difference of a current timestamp and the last accessed time 308 of the accessed track. The entire cache residency time may be calculated as a difference of a current timestamp and a last accessed timestamp 308 of a track at the LRU end 204 of the cache list 200. Alternatively, the entire cache residency time may be calculated as a difference of a last accessed timestamp 308 of a track at the MRU end 202 and a last accessed timestamp 308 of a track at the LRU end 204. The predetermined percentage applied to the entire cache residency time to determine the region of lowest track cache residency times may comprise a value less than 50%, e.g., 25%, which encompasses the upper most recently accessed tracks whose caching is most likely to contribute to improvements in the cache hit ratio.

If (at block 416) the track cache residency time of the processed track is in the region of lowest track cache residency times, i.e., having been in cache 116 for a lessor time than tracks not in the region, then the re-MRU flag 310 in the cache control block 300$_i$ for the accessed track is set (at block 418) to indicate to re-MRU the track, and the track is left at its current position in the cache list 200. However, because the last accessed timestamp 308 for the accessed track is updated, the track is now at the top of the upper portion of cache residency, i.e., in cache the shortest period of time of all tracks. If (at block 416) the track is not in the region of lowest track cache residency times of tracks in the cache list 200, then control proceeds to block 408 to remove indication of the track from the cache list 200 to add to the MRU array 126.

If (at block 402) the accessed track is not in the cache 116, then the track is staged (at block 420) from the volume 108 to the cache 116. A cache control block 300$_i$ for the staged track is added (at block 422) to the cache control block directory 300, the last accessed timestamp 308 is set to a current timestamp, and the re-MRU flag 310 is set to indicate to not re-MRU. The accessed track is then indicated in the MRU array 126 to batch add to the MRU end 202 with other tracks indicated in the MRU array 126.

With the embodiment of FIG. 4, a requested track indicated in the cache list 200 that has a track cache residency time in a region of lowest track cache residency times of tracks in the cache list 200 (meaning it has been in the cache less with respect to its last accessed timestamp 308 than other tracks not in the region) remains in the cache list 200 in its current position without adding to the MRU array 126. This reduces cache access latency because more recently accessed tracks having a lower track cache residency time due to their continually updated last accessed timestamp 308 are not continually moved to the MRU array 126 and batch indicated at the MRU end 202, but remain in the cache list 200 at their current position, with their last accessed timestamp updated 308. Just setting the re-MRU flag 310 at block 418 and not adding the track to the MRU array 126 avoids the latency required to add a track to the MRU array 126 and process the MRU array 126 to batch add tracks to the MRU end 202 because a lock is needed to remove the track from the cache list 200 or add to the MRU end 202. However, accessed tracks having a longer track cache residency, longer than the residency time within the region of lowest track cache residency times of tracks in the cache list 200, are removed from the cache list 200 and added to the MRU array 126 because they are less likely to be accessed again than the more recently accessed track in the upper region. This further improves the cache hit ratio by leaving more recently accessed tracks in the cache list 200, while the tracks that have been in cache relatively longer and less likely to be accessed, are moved to the MRU array 126.

Figure 5:
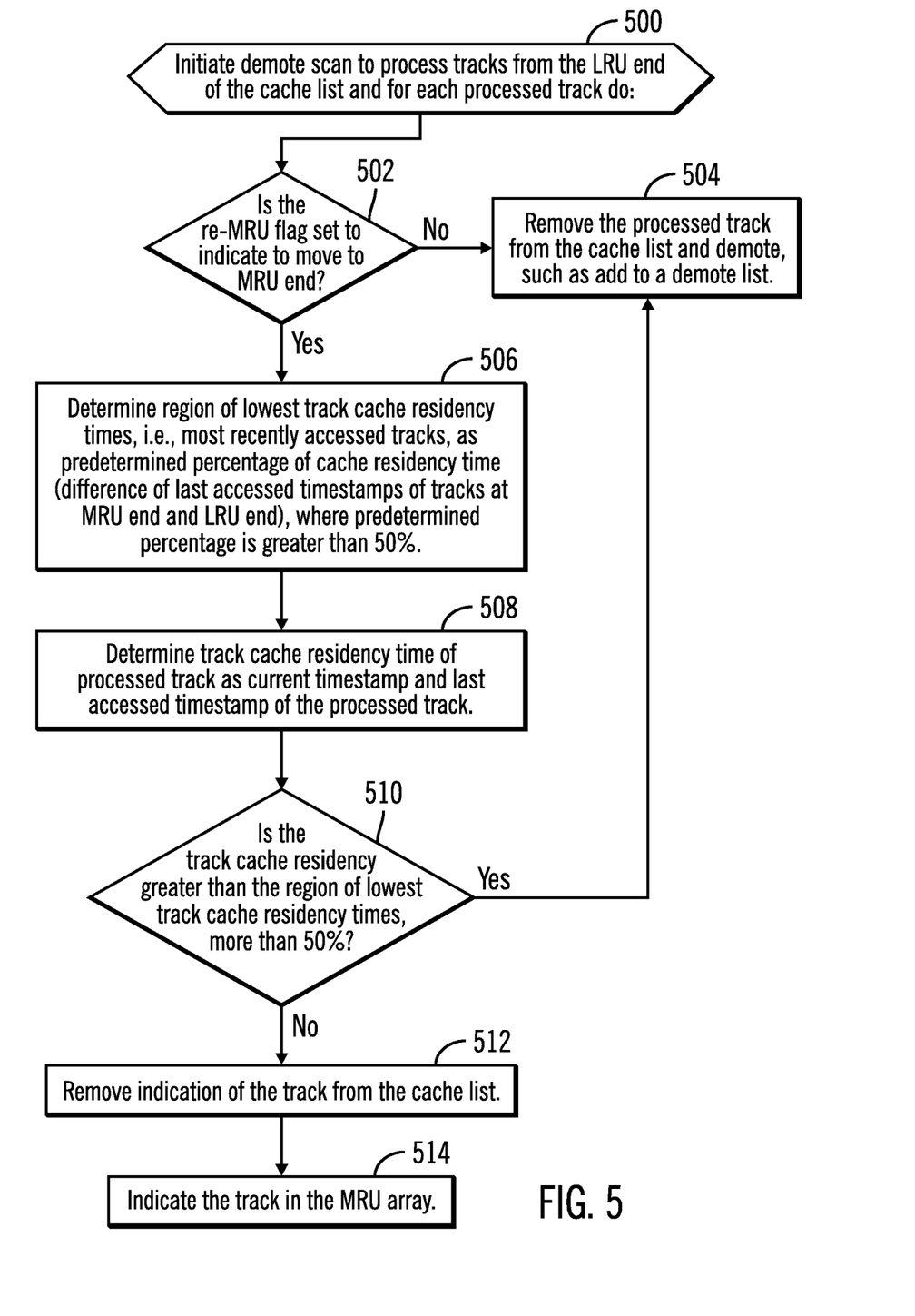
FIG. 5 illustrates an embodiment of operations to initiate a demote scan to demote tracks from the LRU end of the cache list.

FIG. 5 illustrates an embodiment of operations performed by the demote scan task 130 periodically invoked to process tracks from the LRU end 204 of the cache list 200 to demote from cache. Upon processing (at block 500) a track to demote at the LRU end 204, if (at block 502) the re-MRU flag 310 is not set, indicating the track was not recently accessed since last added to the cache 116, then the processed track is removed (at block 504) from the cache list 200 and demoted, such as added to the demote ready list 128, from where tracks are removed from cache 116. If (at block 502) the re-MRU flag 310 indicates to re-MRU or move the track toward the MRU end 202, then a determination is made (at block 506) of the region of lowest track cache residency times of tracks in the cache list 200, such as a predetermined percentage of cache residency time, where predetermined percentage is greater than 50%. For instance, this region of lowest track cache residency times may comprise more than 50% of the cache residency, such as 75% of the tracks having been more recently accessed, i.e., in cache less of a time since last accessed. In this way the region of lowest track cache residency times of tracks in the cache list 200 may be different for the determination at block 416 in FIG. 4 where it is less than 50%, such as 25%, and at block 510 in FIG. 5 where is greater than 50%, s such as 75%.

The track cache residency time is determined (at block 508), such as described above. If (at block 510), the track cache residency time is greater than the region of lowest track cache residency times, then the track has been resident in cache 116 longer than tracks in the region, and control proceeds to block 504 to remove the processed track from the cache list 200 and demote, such as add to a demote ready list 128.

If (at block 510), the track residency time is less than the region of lowest track cache residency times of tracks in the cache list 200, then indication of the track is removed (at block 512) from the cache list 200 and the track is indicated (at block 512) in the MRU array 126.

With the embodiment of FIG. 5, a track is not demoted if it has the re-MRU flag 310 set to indicate that the track was accessed while in the cache list 200 and if the track cache residency time indicates it has been in cache 116 for a time within the region of lowest track cache residency times of tracks in the cache list 200. In such case, the track was accessed while in cache so it is added to the MRU array 126 to re-MRU because it is identified as being more recently accessed. Re-MRUing more recently accessed tracks improves the cache hit ratio.

Figure 6:
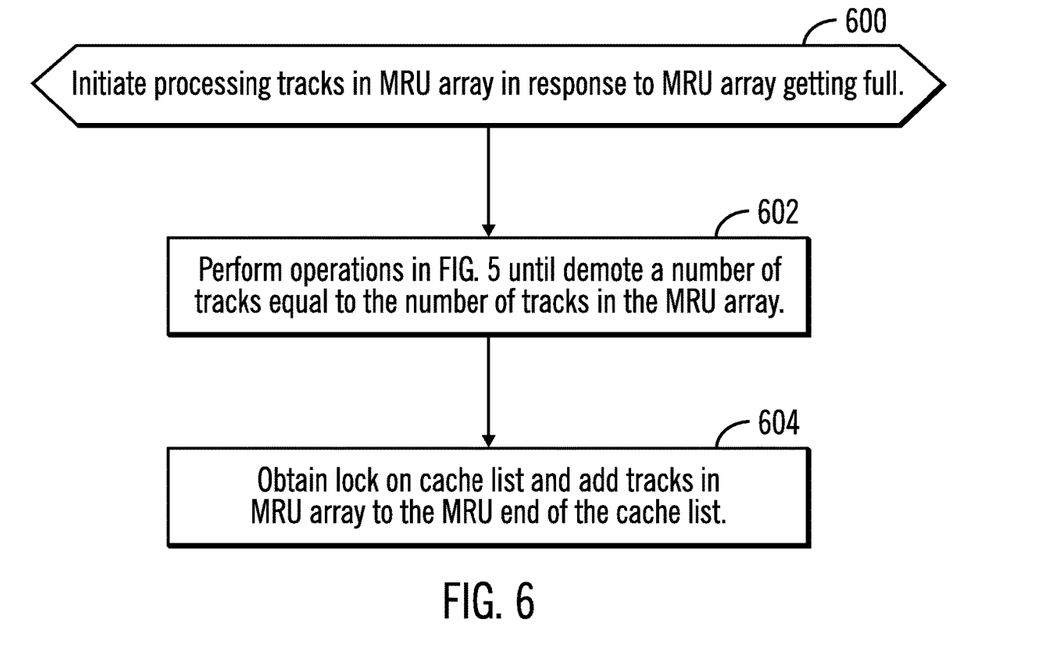
FIG. 6 illustrates an embodiment of operations to process tracks in an MRU array.

FIG. 6 illustrates an embodiment of operations performed by the cache manager 120 and/or demote scan task 130 to process the MRU array 126 to add tracks to the MRU end 202 of the cache list 200. The MRU array 126 may be processed when the number of tracks equals a threshold or the MRU array 126 is full. Upon initiating (at block 600) processing of tracks in the MRU array 126, control proceeds to perform operations of FIG. 5 until the demote scan task 130 demotes a number of tracks equal to the number of tracks in the MRU array 126 to add to the cache list 200. Control then proceeds (at block 604) to obtain a lock on cache list 200 and add tracks in MRU array 126 to the MRU end 202 of the cache list 200.

With the embodiment of FIG. 6, tracks added to the cache 116 or determined to re-MRU are not immediately indicated to the MRU end 202, which would cause latency delays to obtain a lock to the cache list 200. Instead, tracks added to the cache 116 are indicated in the MRU array 126 and batched processed to move to the MRU end 202, i.e., added to the MRU end 202 while the lock is held for the cache list 200, to avoid lock contention to indicate tracks at the MRU end 202.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the hosts $102_1$, $102_2$ ... $102_n$, and storage controller 104, may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

Figure 7:
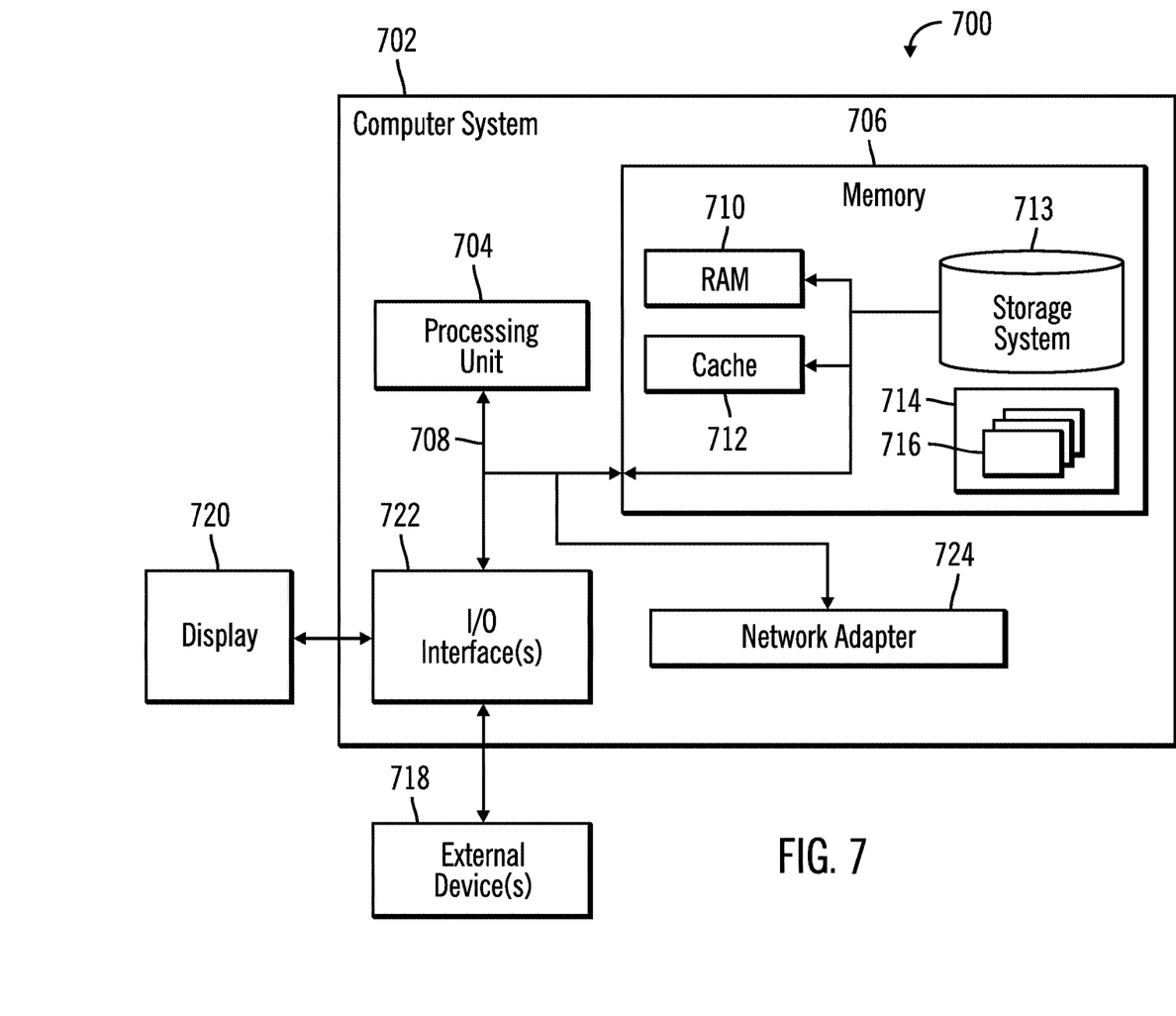
FIG. 7 illustrates a computing environment in which the components of FIG. 1 may be implemented.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing tracks in a storage in a cache, the computer program product comprising a computer readable storage medium having computer readable program code embodied therein that when executed performs operations, the operations comprising:
   maintaining a cache list for the cache having a least recently used (LRU) end and a most recently used (MRU) end, wherein tracks in the cache are indicated in the cache list;
   accessing a track in the cache indicated at a current position on the cache list;
   determining whether a track cache residency time since the accessed track was last accessed while in the cache list is within a region of lowest track cache residency times; and
   in response to determining that the track cache residency time of the accessed track is within the region of lowest track cache residency times, setting a flag to indicate that the accessed track is to be indicated at the MRU end, wherein the accessed track remains at the current position in the cache list after setting the flag until the accessed track is not within the region of lowest track cache residency times.

2. The computer program product of claim 1, wherein the operations further comprise:
   in response to determining that the track cache residency time is not within the region of lowest track cache residency times, removing indication of the accessed track from the cache list and adding indication of the accessed track to an MRU array, wherein tracks indicated in the MRU array are added in batch to the MRU end of the cache list.

3. The computer program product of claim 1, wherein the operations further comprise:
   processing a track at the LRU end of the cache list;
   determining whether the flag for the processed track is set to indicate the track is to be indicated at the MRU end;
   demoting the processed track in response to determining that the flag for the processed track is not set to indicate the track is to be indicated at the MRU end;
   determining whether to indicate the processed track at the MRU end of the cache list in response to determining that the flag is set to indicate the track is to be indicated at the MRU end;
   indicating the processed track at the MRU end of the cache list in response to determining to indicate the processed track at the MRU end of the cache list; and
   demoting the processed track in response to determining to not indicate the processed track at the MRU end of the cache list.

4. The computer program product of claim 1, wherein the region of lowest track cache residency times comprises a first region, wherein the operations further comprise:
   processing a track at the LRU end of the cache list;
   determining whether the flag for the processed track is set to indicate the track is to be indicated at the MRU end;
   determining whether a track cache residency time since the processed track was last accessed is in a second region of lowest track cache residency times of tracks in the cache list in response to determining that the flag is set to indicate the track is to be indicated at the MRU end of the cache list, and wherein the first region is less of a percentage of an entire cache residency time than the second region;
   initiating indication of the processed track at the MRU end of the cache list in response to determining that the track cache residency time is within the second region of lowest track cache residency times; and
   demoting the processed track in response to determining one of that the flag is not set to indicate the processed track is to be indicated at the MRU end of the cache list and that the track cache residency time is not within the region of lowest track cache residency times.

5. The computer program product of claim 4, wherein the first region comprises less than fifty percent of the entire cache residency time and the second region comprises more than fifty percent of the entire cache residency time.

6. The computer program product of claim 5,
   wherein the track cache residency time comprises a difference of a current timestamp and a last accessed timestamp indicating when the processed track was last accessed in the cache,
   wherein the entire cache residency time comprises a difference of a last accessed timestamp a track at the MRU end was last accessed and a last accessed timestamp of a track at the LRU end.

7. The computer program product of claim 1, wherein the operations further comprise:
   determining whether a cache size of the cache is less than a threshold cache size; and
   removing indication of the accessed track from the cache list to add to an MRU array in response to determining that the cache size is less than the threshold cache size, wherein tracks indicated in the MRU array are added in batch to the MRU end of the cache list, wherein the determining whether the accessed track is in the region of lowest track cache residency times is performed in response to determining that the cache size is greater than the threshold cache size.

8. A system for managing tracks in a storage, comprising:
   a processor;
   a cache in a memory device;
   a computer program product comprising a computer readable storage medium having computer readable program code embodied therein that when executed performs operations, the operations comprising:
     maintaining a cache list for the cache having a least recently used (LRU) end and a most recently used (MRU) end, wherein tracks in the cache are indicated in the cache list;
     accessing a track in the cache indicated at a current position on the cache list;

determining whether a track cache residency time since the accessed track was last accessed while in the cache list is within a region of lowest track cache residency times; and in response to determining that the track cache residency time of the accessed track is within the region of lowest track cache residency times, setting a flag to indicate that the accessed track is to be indicated at the MRU end, wherein the accessed track remains at the current position in the cache list after setting the flag until the accessed track is not within the region of lowest track cache residency times.

9. The system of claim 8, wherein the operations further comprise:

in response to determining that the track cache residency time is not within the region of lowest track cache residency times, removing indication of the accessed track from the cache list and adding indication of the accessed track to an MRU array, wherein tracks indicated in the MRU array are added in batch to the MRU end of the cache list.

10. The system of claim 8, wherein the operations further comprise:

processing a track at the LRU end of the cache list;
determining whether the flag for the processed track is set to indicate the track is to be indicated at the MRU end;
demoting the processed track in response to determining that the flag for the processed track is not set to indicate the track is to be indicated at the MRU end;
determining whether to indicate the processed track at the MRU end of the cache list in response to determining that the flag is set to indicate the track is to be indicated at the MRU end;
indicating the processed track at the MRU end of the cache list in response to determining to indicate the processed track at the MRU end of the cache list; and
demoting the processed track in response to determining to not indicate the processed track at the MRU end of the cache list.

11. The system of claim 8, wherein the region of lowest track cache residency times comprises a first region, wherein the operations further comprise:

processing a track at the LRU end of the cache list;
determining whether the flag for the processed track is set to indicate the track is to be indicated at the MRU end;
determining whether a track cache residency time since the processed track was last accessed is in a second region of lowest track cache residency times of tracks in the cache list in response to determining that the flag is set to indicate the track is to be indicated at the MRU end of the cache list, and wherein the first region is less of a percentage of an entire cache residency time than the second region;
initiating indication of the processed track at the MRU end of the cache list in response to determining that the track cache residency time is within the second region of lowest track cache residency times; and
demoting the processed track in response to determining one of that the flag is not set to indicate the processed track is to be indicated at the MRU end of the cache list and that the track cache residency time is not within the region of lowest track cache residency times.

12. The system of claim 11, wherein the first region comprises less than fifty percent of the entire cache residency time and the second region comprises more than fifty percent of the entire cache residency time.

13. The system of claim 12, wherein the track cache residency time comprises a difference of a current timestamp and a last accessed timestamp indicating when the processed track was last accessed in the cache, wherein the entire cache residency time comprises a difference of a last accessed timestamp a track at the MRU end was last accessed and a last accessed timestamp of a track at the LRU end.

14. The system of claim 8, wherein the operations further comprise:

determining whether a cache size of the cache is less than a threshold cache size; and
removing indication of the accessed track from the cache list to add to an MRU array in response to determining that the cache size is less than the threshold cache size, wherein tracks indicated in the MRU array are added in batch to the MRU end of the cache list, wherein the determining whether the accessed track is in the region of lowest track cache residency times is performed in response to determining that the cache size is greater than the threshold cache size.

15. A method for managing tracks in a storage in a cache, comprising:

maintaining a cache list for the cache having a least recently used (LRU) end and a most recently used (MRU) end, wherein tracks in the cache are indicated in the cache list;
accessing a track in the cache indicated at a current position on the cache list;
determining whether a track cache residency time since the accessed track was last accessed while in the cache list is within a region of lowest track cache residency times; and
in response to determining that the track cache residency time of the accessed track is within the region of lowest track cache residency times, setting a flag to indicate that the accessed track is to be indicated at the MRU end, wherein the accessed track remains at the current position in the cache list after setting the flag until the accessed track is not within the region of lowest track cache residency times.

16. The method of claim 15, further comprising:

in response to determining that the track cache residency time is not within the region of lowest track cache residency times, removing indication of the accessed track from the cache list and adding indication of the accessed track to an MRU array, wherein tracks indicated in the MRU array are added in batch to the MRU end of the cache list.

17. The method of claim 15, further comprising:

processing a track at the LRU end of the cache list;
determining whether the flag for the processed track is set to indicate the track is to be indicated at the MRU end;
demoting the processed track in response to determining that the flag for the processed track is not set to indicate the track is to be indicated at the MRU end;
determining whether to indicate the processed track at the MRU end of the cache list in response to determining that the flag is set to indicate the track is to be indicated at the MRU end;
indicating the processed track at the MRU end of the cache list in response to determining to indicate the processed track at the MRU end of the cache list; and
demoting the processed track in response to determining to not indicate the processed track at the MRU end of the cache list.

18. The method of claim 15, wherein the region of lowest track cache residency times comprises a first region, further comprising:
- processing a track at the LRU end of the cache list;
- determining whether the flag for the processed track is set to indicate the track is to be indicated at the MRU end;
- determining whether a track cache residency time since the processed track was last accessed is in a second region of lowest track cache residency times of tracks in the cache list in response to determining that the flag is set to indicate the track is to be indicated at the MRU end of the cache list, and wherein the first region is less of a percentage of an entire cache residency time than the second region;
- initiating indication of the processed track at the MRU end of the cache list in response to determining that the track cache residency time is within the second region of lowest track cache residency times; and
- demoting the processed track in response to determining one of that the flag is not set to indicate the processed track is to be indicated at the MRU end of the cache list and that the track cache residency time is not within the region of lowest track cache residency times.

19. The method of claim 18, wherein the first region comprises less than fifty percent of the entire cache residency time and the second region comprises more than fifty percent of the entire cache residency time.

20. The method of claim 19,
- wherein the track cache residency time comprises a difference of a current timestamp and a last accessed timestamp indicating when the processed track was last accessed in the cache,
- wherein the entire cache residency time comprises a difference of a last accessed timestamp a track at the MRU end was last accessed and a last accessed timestamp of a track at the LRU end.

21. The method of claim 15, further comprising:
- determining whether a cache size of the cache is less than a threshold cache size; and
- removing indication of the accessed track from the cache list to add to an MRU array in response to determining that the cache size is less than the threshold cache size, wherein tracks indicated in the MRU array are added in batch to the MRU end of the cache list, wherein the determining whether the accessed track is in the region of lowest track cache residency times is performed in response to determining that the cache size is greater than the threshold cache size.

* * * * *